Aug. 18, 1953    W. VOGEL ET AL    2,649,083
SUPERCHARGING FOUR-STROKE INTERNAL-COMBUSTION ENGINE
Filed Feb. 5, 1951
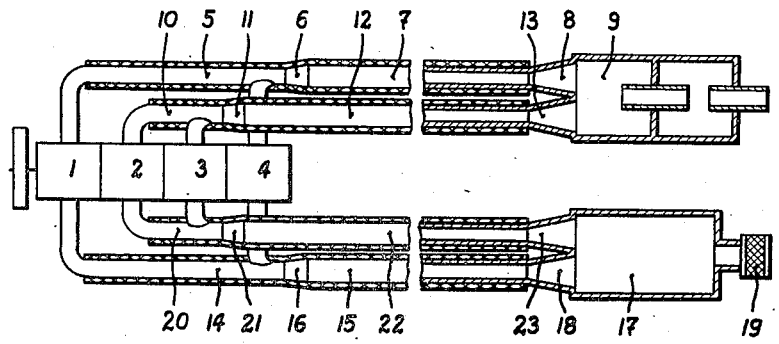
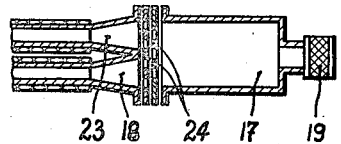
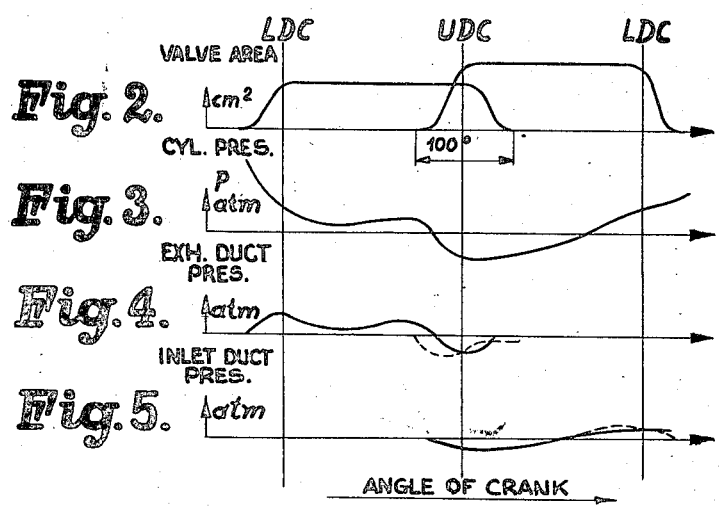
INVENTORS
WILHELM VOGEL
HANS SEIFERT
BY
ATTORNEYS Patented Aug. 18, 1953

2,649,083

UNITED STATES PATENT OFFICE 2,649,083

SUPERCHARGING FOUR-STROKE INTERNAL-COMBUSTION ENGINE

Wilhelm Vogel and Hans Seifert, Augsburg, Germany, assignors to Maschinenfabrik Augsburg-Nurnberg A. G., Augsburg, Germany, a corporation of the German Republic Application February 5, 1951, Serial No. 209,383
In Germany February 22, 1950

10 Claims. (Cl. 123—75)

This invention relates to a method of operation for supercharging four-stroke internal combustion engines.

It is known that in four-stroke internal combustion engines the particularly powerful part of the pressure wave resulting in the exhaust pipe or duct shortly after the opening of the exhaust valve is negatively reflected at the open end of the pipe and, therefore, arrives at the cylinder in the form of a negative pressure wave. Where this wave of a negative amplitude arrives during the exhausting process, the exhaust energy will be reduced, if the piston at this point of time has a high speed. The time interval (in terms of angular crankshaft displacement) between the advancing positive pressure waves and the retrograding negative pressure wave is between 70° and 120° angle of the crank. Where the negative pressure wave arrives later, it will ensure a better flowing off of the exhaust gases left, but will be reflected in a positive way, i. e. as a wave of negative amplitude, on the closing exhaust valve in the further course of the operation. This negative pressure wave, if running to the end of the pipe, will be reflected in the form of a positive pressure wave disturbing, primarily in a multi-cylinder engine whose cylinders are all connected to one exhaust pipe, the exhaust process of the subsequent cycles of operation.

It is also known that is possible, by choosing the length of the suction pipe in a suitable way, to enhance the degree of delivery of four-stroke engines. The downwardly moving piston will produce a negative pressure wave in the suction pipe which runs to the open pipe end where it is negatively reflected. Now, if the retrograding positive pressure wave enters at the cylinder at the time when the piston is nearing the lower dead center position and the inlet valve begins to close, the cylinder will be supercharged. This effect is more pronounced in high speed engines than in low speed engines and in the latter case at best amounts to 4–8%. Owing to the cost and the large space taken up by the relatively long suction pipes, this method hitherto in view of the low increase of output has not been adopted.

It is an object of the present invention to achieve a supercharging which is economical as to the expenditure of cost and space.

With this and further objects in view, according to the invention the exhaust and suction pipes are formed in such a way as to their length and cross section that the pressure wave produced in the exhaust pipe on opening the exhaust valves and being negatively reflected at the end of the pipe is caused to arrive at the cylinder in the form of a negative pressure wave when the piston is in the upper dead center position or in the vicinity thereof and owing to the overlapping of the valves the exhaust and inlet valves are open simultaneously, so that the negative pressure wave can enter into the suction pipe through the cylinder, being once more reflected as a positive pressure wave at the opposite end thereof. As a result of the increased weight of the charge the engine in this case by a corresponding increase of the fuel fed is enabled to produce a larger output with the result that also an increased exhaust pressure wave is produced. The whole pressure wave supercharging process is still increased through this "reaction coupling" via the cylinder, thus reaching a maximum efficiency. The obtainable increase of the weight of the charge amounts to about 20 to 40 percent if the pipes are designed as accurately as possible according to all data hitherto known as to the calculation of pressure waves. The limit of this supercharging process owing to the friction, superposition of waves etc. is at about 60 percent. In this case, the critical value of the velocity of sound is nearly reached both at the zone of transition from the exhaust diffuser to the exhaust pipe and at the open mouth of the suction pipe.

Other and further objects, features and advantages of the invention will be pointed out hereinafter and appear in the appended claims forming part of the application.

In the accompanying drawing a now preferred embodiment of the invention is shown by way of illustration and not by way of limitation.

Fig. 1 is a sectional diagram of the various ducts provided on the engine,

Fig. 2 is a diagram showing the effective open cross section of the valves, plotted against angle of crank, Fig. 3 is a diagram showing the pressure in the cylinder plotted against rotation of the crank shaft during exhaust and intake strokes of the four-stroke cycle, Fig. 4 is a diagram showing the pressure wave outside the exhaust valve, Fig. 5 is a diagram of the pressure wave outside the inlet valve, and Fig. 6 is a sectional view showing the arrangement of the return valves or throttles before the suction muffler.

Similar reference numerals denote similar parts in the different views.

Referring to Fig. 1, it will be noted that 1, 2, 3, and 4 are the cylinders of an internal combustion engine. From the cylinders 1 and 4 the exhaust gases flow into the common narrow collection pipe 5 and from this through the diffuser 6 to the enlarged exhaust pipe 7 which is connected, through the mouth diffuser 8, to the exhaust muffler 9 receiving also the gases from the cylinders 2 and 3 through the narrow collection pipe 10, the intermediate diffuser 11, the wide exhaust pipe 12 and the mouth diffuser 13. The pipe system on the suction side of the internal combustion engine is designed accordingly. Here again narrow and wide parts of the suction pipe 14 or 15 are provided for the cylinders 1 and 4, which parts are interconnected by a diffuser 16 and connected to the suction muffler 17 through a mouth diffuser 18. Connected in front of the suction muffler 17 is an air filter 19. The cylinders 2 and 3 are connected to the suction muffler 17 through the narrow pipe 20, the diffuser 21, the wide pipe 22 and the mouth diffuser 23. All pipes may be surrounded by a heat insulation of the type indicated on the exhaust pipes 5, 7, 10 and 12, and the suction pipes 14, 15, 20, and 22.

Fig. 6 shows the arrangement of the non-return valves or throttles 24 behind the suction silencer or muffler 17. If desired, the device 24 may also be arranged before the silencer. The same is true for the exhaust muffler.

From the course of the pressure wave behind the exhaust valve and before the inlet valve as shown in Figs. 4 and 5 it will be clearly seen how the supercharging takes place in the process according to the invention. The curve shown in full lines in Fig. 4 indicates the positive pressure wave starting from the exhaust valve and being negatively reflected at the end of the exhaust duct, returning as a negative pressure wave (dotted line). In Fig. 5 the full line shows the negative pressure wave starting from the inlet valve and proceeding to the beginning of the suction pipe from which it likewise returns as a positive pressure or supercharging wave (dotted line).

In contrast to a conventional motor where the pressure within the cylinder increases throughout the ascent of the piston, the cylinder pressure according to this invention, as plotted in Fig. 3, actually falls off as the piston approaches upper dead-center between exhaust and intake strokes. This is because the positive exhaust pressure wave, reflected from the open end of the exhaust duct, returns to the cylinder as a negative pressure just before upper dead-center. Thus the pressure increase within the cylinder occasioned by the ascending piston is essentially offset by the reflected negative pressure in the exhaust duct. As plotted in Fig. 3, a further reduction of cylinder pressure occurs after upper dead-center as the then descending piston combines with the reflected negative pressure to lower cylinder pressure and such in combustion air from the inlet duct.

Advantageously, a number of special measures should be taken in order to attain maximum efficiency of supercharging. Not more than two or three cylinders should be connected to one exhaust or suction pipe, and the control periods should not overlap. In order that the waves going out from, or arriving at, a cylinder, may be damped as little as possible, it shall be avoided that the part of the pipe adjacent to the cylinders connected to the respective pipe acts as a container. Therefore, it should be made with a smaller cross section than the rest of the exhaust or suction pipe. In order to avoid losses due to shocks, the transitional part from the constricted collection pipe into the exhaust or suction pipe should be in the form of a diffuser which should be as short as it is possible with a view to the phenomena of flow (detaching of the flow from the wall). Moreover it is advantageous to provide at the open ends of the exhaust pipes and if desired, of the suction pipes, diffusers, in order that the loss of kinetic energy of the pressure waves may be reduced to a minimum. The length of the enlargement should be small in proportion to the wave length, in order that the shape of the short but powerful wave is preserved and does not become wider, with simultaneous reduction of the amplitude. The ratio of enlargement of the cross section is made as large as this is possible in view of the frictional losses occurring, i. e. about 2–4. If an exhaust box of a large capacity is provided as a silencer on the large end of the diffuser, no substantial changes will result.

Under certain circumstances it may be possible, however, that the succeeding exhaust or suction processes of a cylinder subsequently fired but being connected to the same pipe are influenced by the reflected wave (or such portion of the energy thereof as is not expended in supercharging). On the one hand, this is desirable, since the wave amplitudes are amplified thereby; on the other hand it has been found that the course of the pressure in the cylinder is unfavorably affected thereby. In the exhaust process the exhaust energy is greatly increased by such increased amplitudes, in the suction process, however, the cylinder pressure is reduced so much by the arriving negative pressure wave that the positive pressure wave arriving towards the end of the process cannot any longer produce the expected supercharging effect since it must first equalize the reduced pressure. In this case, it is advantageous to provide automatic return valves or throttles at the free ends of the exhaust- and/or suction pipes or before or behind the respective mufflers oriented to favor escape of pressure from the end of the exhaust pipe and retention of pressure at the end of the suction pipe. Thus a higher average negative pressure is produced in the exhaust pipes and a positive pressure is produced in the suction pipes.

Finally a heat insulation of the exhaust pipe and also of the suction pipe is advantageous, in order to avoid a loss of energy of the pressure waves in the exhaust pipe or reduction of the amplitude of the retrograding negative pressure wave by heating.

Where the turbine of a supercharging group is arranged behind the exhaust box and the compressor is arranged before the suction pipe box, the said pressure wave supercharging method will yield considerable advantages also for the supercharging with exhaust gas turbo-compressor.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. A supercharged four-stroke cycle internal combustion engine adapted for producing successively power, exhaust, intake, and compression strokes at a predetermined frequency comprising in combination a cylinder, a piston operable within said cylinder, exhaust and inlet ports in said cylinder, exhaust and inlet valves controlling said ports, means for selectively and independently opening and closing said valves at predetermined positions of said piston within said cylinder including means for maintaining both said exhaust valve and said inlet valve open simultaneously for a substantial interval while said piston is approximately at upper dead center between said exhaust and said intake strokes, an exhaust duct communicating with said exhaust port in tuned resonating relation with pulsations from said exhaust port, the length and correlated cross-sectional area of said exhaust duct effecting negative reflection at the end of said duct of pressure waves produced in said duct upon opening of said exhaust valve in timed relation with said predetermined frequency for returning said negatively reflected waves to said cylinder during said simultaneous opening of said exhaust and inlet valves, and an inlet duct communicating with said inlet port in tuned resonating relation with pulsations from said inlet port, the length and correlated cross-sectional area of said inlet duct effecting negative reflection of said negative pressure waves introduced into said inlet duct from said exhaust duct during said simultaneous opening of said valves for returning said reflected waves to said inlet port prior to the closing thereof.

2. A supercharged four-stroke cycle internal combustion engine comprising in combination a cylinder adapted for operation at a predetermined frequency, a piston operable within said cylinder from an upper dead center position to a lower dead center position, exhaust and inlet ports in said cylinder, exhaust and inlet valves controlling said ports, means for selectively and independently opening and closing said valves at predetermined positions of said piston corresponding to said predetermined frequency including means for maintaining both said exhaust valve and said inlet valve open simultaneously for a substantial interval while said piston is approximately at upper dead center position and means for maintaining one of said valves open and the other of said valves closed at alternate lower dead center positions of said piston, an exhaust duct communicating with said exhaust port and having correlated length and cross-sectional area effecting tuned quarter-wave resonance with pulsations from said exhaust port, and an inlet duct communicating with said inlet port and having correlated length and cross-sectional area effecting tuned quarter-wave resonance with pulsations from said inlet port.

3. A supercharged four-stroke cycle internal combustion engine comprising in combination a plurality of cylinders adapted for operating in a predetermined order at a predetermined frequency, a piston operable within each said cylinder, exhaust and inlet ports in each said cylinder, exhaust and inlet valves controlling said ports, means for selectively and independently opening and closing said valves in predetermined positions of said pistons corresponding to said predetermined order and frequency including means for maintaining the exhaust and inlet valves of each said cylinder open simultaneously for a substantial interval while the piston in said cylinder is approximately at upper dead position between exhaust and intake strokes of said four-stroke cycle, an exhaust duct communicating with exhaust ports in such of said cylinders as operate simultaneously according to said predetermined order, a second exhaust duct communicating with exhaust ports in others of said cylinders operating simultaneously at a different time according to said predetermined firing order, an inlet duct communicating with inlet ports in such of said cylinders as operate simultaneously according to said predetermined order, a second inlet duct communicating with inlet ports in others of said cylinders operating simultaneously at a different time according to said predetermined order, the length and correlated cross-sectional areas of each of said ducts effecting tuned resonance with pulsations entering said ducts at said ports according to said predetermined frequency for negative reflection at the ends of said ducts of pressure waves entering said ducts through said ports and returning reflected waves in said exhaust duct to said cylinder while exhaust and inlet valves therein are simultaneously open and returning reflected waves in said intake duct to said cylinder prior to closing of said inlet valve in said cylinder.

4. In a supercharged four-stroke cycle internal combustion engine having a cylinder adapted for firing at a predetermined frequency, a piston operable within said cylinder, exhaust and inlet ports in said cylinder, and exhaust and inlet valves controlling said ports, the combination comprising an exhaust duct communicating with said exhaust port in tuned resonating relation with pulsations from said exhaust port, an inlet duct communicating with said inlet port in tuned resonating relation with pulsations from said inlet port, means for opening both said exhaust valve and said inlet valve simultaneously for a substantial interval while said piston is approximately at upper dead center position between exhaust and intake strokes of said four-stroke cycle providing communication from said exhaust duct into said inlet duct through said cylinder and for closing said exhaust valve after said exhaust stroke while maintaining said inlet valve open throughout the intake stroke of said four-stroke cycle, the lengths and correlated cross-sectional areas of said ducts effecting negative reflection of pressure waves produced therein upon opening of said valves in timed relation with said predetermined frequency for returning negatively reflected waves in said exhaust duct to said cylinder during said simultaneous opening of said valves and introducing said negatively reflected waves into said inlet duct from said exhaust duct through said cylinder and for returning to said cylinder prior to said closing of said inlet port by negative reflection in said inlet duct said pressure waves introduced therein from said exhaust duct.

5. A supercharged four-stroke cycle internal combustion engine according to claim 4 wherein the effective cross-section of portions of said exhaust and inlet ducts adjacent to said exhaust and inlet ports is substantially less than the cross-section of the remainder of said ducts and comprising a diffuser in each said duct at the juncture of said smaller cross-section portion with said larger cross-section portion.

6. A supercharged four-stroke cycle internal combustion engine apparatus according to claim 4 comprising diffusers at the ends of said ducts for reducing loss of kinetic energy of pressure waves reflected at said ends of said ducts.

7. A supercharged four-stroke cycle internal combustion engine according to claim 4 comprising automatic non-return means adjacent the end of said inlet duct impeding loss of pressure from said duct through said end thereof for increased supercharging of said cylinder by said pressure waves reflected at said end of said duct.

8. A supercharged four-stroke cycle internal combustion engine according to claim 4 comprising automatic non-return means at the end of said exhaust duct impeding return of pressure into said duct through said end thereof for increasing negative pressure in said duct of pressure waves reflected at said end thereof.

9. A supercharged four-stroke cycle internal combustion engine according to claim 4 comprising a diffuser at the end of at least one of said ducts, the length of said diffuser being substantially less than the wave length of said pressure waves in said duct, and a sound muffler at the end of said duct outwardly of said diffuser.

10. A supercharged four-stroke cycle internal combustion engine according to claim 9 comprising automatic non-return means mounted at the outer end of said muffler impeding passage of pressure therethrough in one direction for reinforcing pressure conditions in said duct produced by said pressure waves reflected in said end thereof.

WILHELM VOGEL.
HANS SEIFERT.

References Cited in the file of this patent

UNITED STATES PATENTS

| Number | Name | Date |
| --- | --- | --- |
| 1,802,848 | Summers | Apr. 28, 1931 |
| 2,130,721 | Kadenacy | Sept. 20, 1938 |
| 2,305,946 | Wilson et al. | Dec. 22, 1942 |
| 2,476,816 | Carter | July 19, 1949 |

FOREIGN PATENTS

| Number | Country | Date |
| --- | --- | --- |
| 442,940 | Great Britain | Feb. 18, 1936 |